US012763050B2

(12) United States Patent
Sato et al.

(10) Patent No.: US 12,763,050 B2
(45) Date of Patent: Oct. 13, 2026

(54) ELECTRONIC MUSICAL INSTRUMENTS, METHOD AND STORAGE MEDIA THEREFOR

(71) Applicant: CASIO COMPUTER CO., LTD., Tokyo (JP)

(72) Inventors: Hiroki Sato, Tokyo (JP); Hajime Kawashima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1084 days.

(21) Appl. No.: 17/832,528

(22) Filed: Jun. 3, 2022

(65) Prior Publication Data

US 2022/0406282 A1 Dec. 22, 2022

(30) Foreign Application Priority Data

Jun. 17, 2021 (JP) ................................ 2021-100632
Jun. 29, 2021 (JP) ................................ 2021-107845

(51) Int. Cl.
*G10H 1/14* (2006.01)
*G10H 1/00* (2006.01)
(Continued)

(52) U.S. Cl.
CPC ............ *G10H 1/14* (2013.01); *G10H 1/0025* (2013.01); *G10H 1/08* (2013.01); *G10H 1/344* (2013.01);
(Continued)

(58) Field of Classification Search
CPC ........ G10H 1/14; G10H 1/0025; G10H 1/344; G10H 1/46; G10H 2210/115;
(Continued)

(56) References Cited

U.S. PATENT DOCUMENTS 5,094,138 A * 3/1992 Otsuka .................. G10H 1/057 84/665
5,686,683 A * 11/1997 Freed ...................... G10H 7/10 84/625
(Continued)

FOREIGN PATENT DOCUMENTS

JP H01-235998 A 9/1989
JP 2001-209382 A 8/2001
(Continued)

OTHER PUBLICATIONS

U.S. Appl. No. 17/751,595, filed May 23, 2022.

*Primary Examiner* — Jeffrey Donels
*Assistant Examiner* — Philip G Scoles
(74) *Attorney, Agent, or Firm* — CHEN YOSHIMURA LLP

(57) ABSTRACT

An electronic musical instrument includes: a performance controller; and at least one processor, configured to perform the following: instructing sound generation of a first musical tone in response to a first operation on the performance controller; in response to a second operation on the performance controller during the sound generation of the first musical tone, obtaining a first amplitude value of the first musical tone at a time of the second operation, and obtaining a second amplitude value at which a second musical tone is to be sound-produced in response to the second operation on the performance controller; acquiring a parameter value for determining at least one of pitch, timbre, and volume of the second musical tone based on a ratio of the first amplitude value to the second amplitude value; and instructing sound generation of the second musical tone in accordance with the acquired parameter value.

13 Claims, 12 Drawing Sheets

(51) Int. Cl.

| | |
|---|---|
| ***G10H 1/08*** | (2006.01) |
| ***G10H 1/34*** | (2006.01) |
| ***G10H 1/46*** | (2006.01) |

(52) U.S. Cl.
CPC ......... *G10H 1/46* (2013.01); *G10H 2210/115* (2013.01); *G10H 2220/221* (2013.01)

(58) Field of Classification Search
CPC .. G10H 2220/221; G10H 1/0575; G10H 1/08; G10H 7/02
See application file for complete search history.

(56) References Cited

U.S. PATENT DOCUMENTS

| | | | | |
|---|---|---|---|---|
| 2004/0025672 A1* | 2/2004 | Carpenter | ................ | G10G 7/02 84/622 |
| 2013/0287227 A1* | 10/2013 | Wallander | ............. | G10H 1/125 381/103 |

FOREIGN PATENT DOCUMENTS

| | | | | |
|---|---|---|---|---|
| JP | 2006-133696 | A | | 5/2006 |
| JP | 2012-108295 | A | | 6/2012 |
| JP | 2012-133056 | A | | 7/2012 |
| JP | 2020064189 | A | * | 4/2020 |
| JP | 2020-129040 | A | | 8/2020 |

* cited by examiner

ELECTRONIC MUSICAL INSTRUMENTS, METHOD AND STORAGE MEDIA THEREFOR

BACKGROUND OF THE INVENTION

Technical Field

The disclosure herein relates to electronic musical instruments, methods and storage media therefor.

Background Art

In an electronic musical instrument, a technique has been known in which when an operation of repeatedly producing a musical tone for a performance operator having a single pitch (hereinafter referred to as "rapid reiteration operation") is performed, the tone is changed so that it sounds relatively natural.

See Japanese Patent Application Laid-Open No. 2020-129040.

SUMMARY OF THE INVENTION

However, there is room for improvement in the technique of bringing the musical sound produced during the rapid reiteration operations on an electronic musical instrument closer to a natural musical sound.

The present invention has been made in view of the above circumstances, and an object thereof is to provide an electronic musical instrument, a method and a program in which improvements have been made to bring a musical sound to be produced when a rapid reiteration operation is performed to be closer to a natural musical sound.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic musical instrument, comprising: a performance controller; and at least one processor, configured to perform the following: instructing sound generation of a first musical tone in response to a first operation on the performance controller; in response to a second operation on the performance controller during the sound generation of the first musical tone, obtaining a first amplitude value of the first musical tone at a time of the second operation, and obtaining a second amplitude value at which a second musical tone is to be sound-produced in response to the second operation on the performance controller; acquiring a parameter value for determining at least one of pitch, timbre, and volume of the second musical tone based on a ratio of the first amplitude value to the second amplitude value; and instructing sound generation of the second musical tone in accordance with the acquired parameter value.

In another aspect, the present disclosure provides a method executed by at least one processor in an electronic musical instrument that includes, in addition to the at least one processor, a performance controller, the method comprising, via the at least one processor: instructing sound generation of a first musical tone in response to a first operation on the performance controller; in response to a second operation on the performance controller during the sound generation of the first musical tone, obtaining a first amplitude value of the first musical tone at a time of the second operation, and obtaining a second amplitude value at which a second musical tone is to be sound-produced in response to the second operation on the performance controller; acquiring a parameter value for determining at least one of pitch, timbre, and volume of the second musical tone based on a ratio of the first amplitude value to the second amplitude value; and instructing sound generation of the second musical tone in accordance with the acquired parameter value.

In another aspect, the present disclosure provides a computer readable non-transitory storage medium storing therein instructions, the instructions causing at least one processor in an electronic musical instrument that includes, in addition to the at least one processor, a performance controller to perform the following: instructing sound generation of a first musical tone in response to a first operation on the performance controller; in response to a second operation on the performance controller during the sound generation of the first musical tone, obtaining a first amplitude value of the first musical tone at a time of the second operation, and obtaining a second amplitude value at which a second musical tone is to be sound-produced in response to the second operation on the performance controller; acquiring a parameter value for determining at least one of pitch, timbre, and volume of the second musical tone based on a ratio of the first amplitude value to the second amplitude value; and instructing sound generation of the second musical tone in accordance with the acquired parameter value.

According to at least some of these aspects of the present invention, there is provided an electronic musical instrument, a method, and a program in which an improvement is added to bring a musical sound to be produced when a rapid reiteration operation is performed to be closer to a natural musical sound.

It is to be understood that both the foregoing general description and the following detailed description are exemplary and explanatory, and are intended to provide further explanation of the invention as claimed.

DETAILED DESCRIPTION OF EMBODIMENTS

The electronic musical instrument according to embodiments of the present invention will be described in detail with reference to the drawings. The method and program according to the embodiments of the present invention are realized by causing a computer/processor (circuit component) of an electronic musical instrument to execute various processes.

Figure 1:
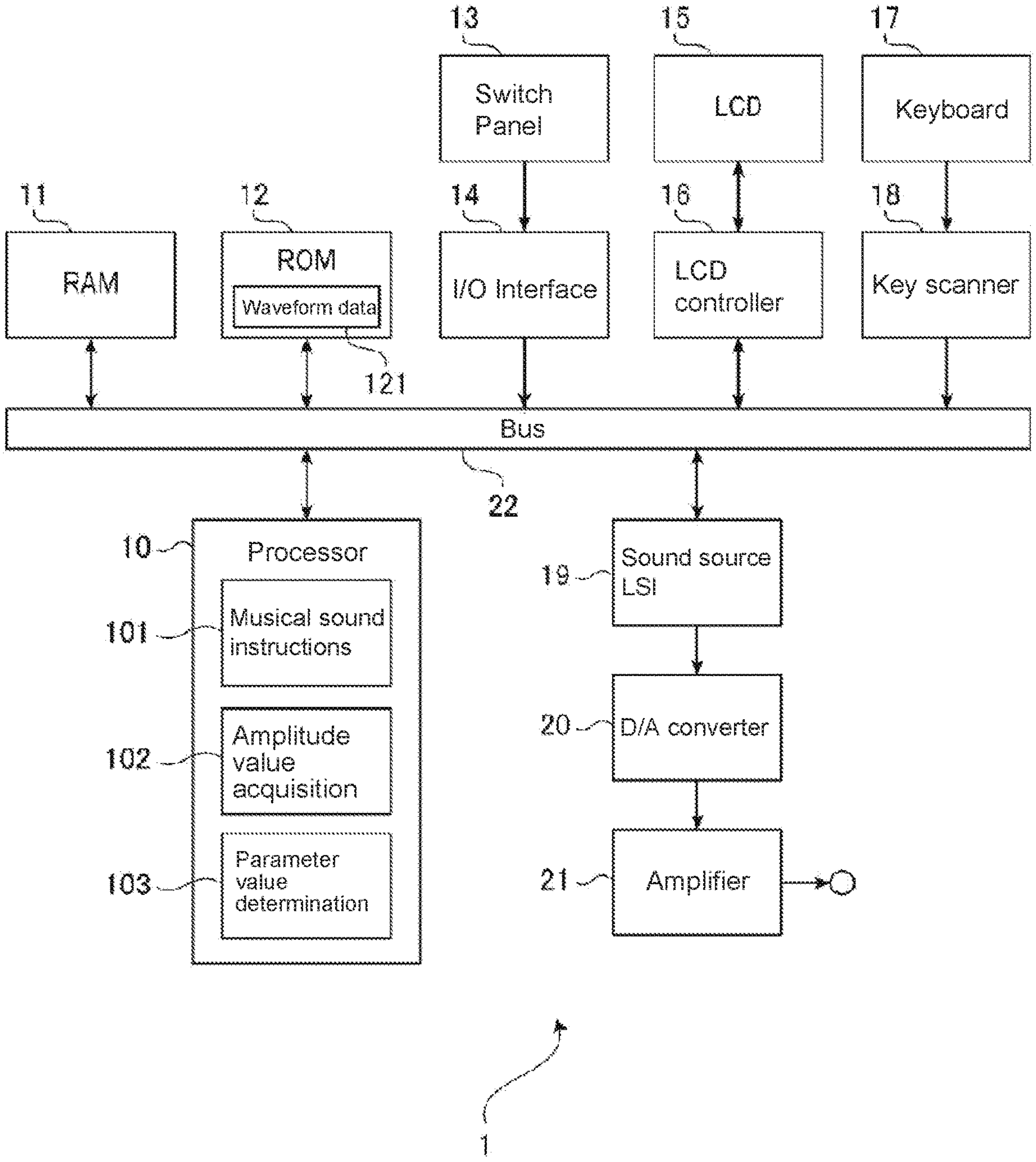
FIG. 1 is a block diagram showing a configuration of an electronic musical instrument according to an embodiment of the present invention.

FIG. 1 is a block diagram showing the configuration of the electronic musical instrument 1. In the present embodiment, the electronic musical instrument 1 is, for example, an electronic piano, and is configured such that when a key with a single pitch is repeatedly hit, a natural musical sound (for example, a characteristic close to that of an acoustic musical instrument) can be produced and heard by moderately changing the pitch, tone, and/or volume.

It should be noted that the technique of the present invention for producing a natural musical sound during the rapid reiteration operations can be applied to electronic musical instruments other than electronic pianos. Specifically, an acoustic instrument of a type that gives an impact to a vibrating body to generate a musical sound (for example, a percussion instrument, a plucked string instrument, a plucked string instrument, a chromatic percussion, etc.) may be configured as an electronic musical instrument within the scope of the present invention.

As shown in FIG. 1, the electronic instrument 1 includes, as hardware configurations, a processor 10, a RAM (Random Access Memory) 11, a ROM (Read Only Memory) 12, a switch panel 13, an input/output interface 14, an LCD (Liquid Crystal Display) 15, an LCD controller 16, a keyboard 17, a key scanner 18, a sound source LSI (Large Scale Integration) 19, a D/A converter 20, and an amplifier 21. These parts of the electronic musical instrument 1 are connected by a bus 22.

The processor 10 collectively controls the electronic musical instrument 1 by reading out the programs and data stored in the ROM 12 and using the RAM 11 as a work area.

The processor 10 is, for example, a single processor or a multiprocessor, and includes at least one processor. In the case of a configuration including a plurality of processors, the processor 10 may be packaged as a single device, or may be composed of a plurality of physically separated devices in the electronic musical instrument 1.

As a functional block, the processor 10 has a musical tone/sound instructions part 101 that instructs the sound generation of a first musical tone/sound in response to a first operation on a performance controller (performance elements), an amplitude value acquisition part 102 that obtains a first amplitude value of the first musical sound in response to a second operation on the performance controller that occurs during the sound generation of the first musical sound and that obtains a second amplitude value of a second sound to be produced in response to the second operation, and a parameter value acquisition part 103 that acquires a parameter value for determining at least one of the pitch, timbre, and volume of the second musical tone based on the ratio of the first amplitude value to the second amplitude value. Here, each functional block of the processor 10 shown in FIG. 1 may be realized by software, or may be partially or wholly realized by hardware such as a dedicated logic circuit.

In this specification, two consecutive key pressing operations are defined as a first operation and a second operation. "Two consecutive key pressing operations" means that the next key pressing operation was performed during the sound production of the sound responsive to the first key pressing operation. Therefore, the second operation means the operation that occurs next to the first operation, performed during the sound production corresponding to the first operation (during the sound production of the first musical sound). In the case of three consecutive key press operations (that is, when the next key press operation is performed while two musical tones corresponding to two consecutive key press operations are being sound-produced), the second key press operation becomes the first operation, and the third key pressing operation becomes the second operation.

RAM 11 temporarily holds data and programs. The RAM 11 holds programs and data read from the ROM 12 and other data necessary for communication.

The ROM 12 is a non-volatile semiconductor memory, such as a flash memory, an EPROM (Erasable Programmable ROM), and an EEPROM (Electrically Erasable Programmable ROM), and plays a role as a secondary storage device or an auxiliary storage device. For example, waveform data 121 is stored in the ROM 12. As an additional note, the ROM 12 stores programs and data used by the processor 10 to perform various processes, and data generated or acquired by the processor 10 performing various processes.

The switch panel 13 is an example of an input device. When the user operates the switch panel 13, a signal indicating the corresponding operation is output to the processor 10 via the input/output interface 14. The switch panel 13 may be, for example, a mechanical type, a capacitive contactless type, a membrane type or the like having key switches, buttons, or the like. The switch panel 13 may be a touch panel.

LCD 15 is an example of a display device. The LCD 15 is driven by the LCD controller 16. When the LCD controller 16 drives the LCD 15 according to the control signal by the processor 10, the LCD 15 displays a screen corresponding to the control signal. The LCD 15 may be replaced with other types of display device, such as an organic EL (Electro Luminescence) or an LED (Light Emitting Diode). The LCD 15 may be a touch panel. In this case, the touch panel may serve as both an input device and a display device.

The keyboard 17 includes a keyboard having a plurality of white keys and a plurality of black keys as a plurality of performance elements. Each key is associated with a different pitch.

The key scanner 18 monitors the key press and release of the keyboard. When the key scanner 18 detects, for example, a key press operation by a user, the key scanner 18 outputs key press event information to the processor 10. The key press event information includes the pitch (key number) of the key related to the key press operation and its speed (velocity value). The velocity value can be said to be a value indicating the strength of the key press operation.

The processor 10 operates as a musical sound/tone instruction part 101 that instructs the sound generation of a musical tone in response to an operation (first operation or second operation) for a key (performance element). The sound source LSI 19 generates a musical tone based on the waveform data read from the ROM 12 under the instruction of the processor 10. In the present embodiment, the sound source LSI 19 can simultaneously produce 128 musical tones. In the present embodiment, the processor 10 and the sound source LSI 19 are configured as separate devices, but in another embodiment, the processor 10 and the sound source LSI 19 may be configured as one processor.

Waveform data information of various tones such as "guitar" and "piano" are registered in the waveform data 121 stored in the ROM 12. In each of the waveform data information of various tones, waveform data are respectively registered to all key numbers for the target tone color (for example, piano). In more detail, for each key number, waveform data corresponding to a specified velocity value (that is, the strength of the operation on the performance element) is registered. For example, with $1<n1<n2<n3<127$, for each key number, the waveform data corresponding to a low velocity value (1 or more and less than n1), the waveform data corresponding to a slightly lower velocity value (n1 or more and less than n2), the waveform data corresponding to a slightly high velocity value (n2 or more and less than n3), and waveform data corresponding to a high velocity value (n3 or more and 127 or less) are registered.

The processor 10 sets a musical tone (guitar, piano, etc.) according to the user's operation on the switch panel 13. The processor 10 reads out the waveform data corresponding to the key press event information (that is, the key number pressed and the velocity value at the time of key press) and the currently set tone color from the waveform data 121.

The musical sound signal generated by the sound source LSI 19 is amplified by the amplifier 21 after DA conversion by the D/A converter 20, and is output to a speaker (not shown).

Figure 2:
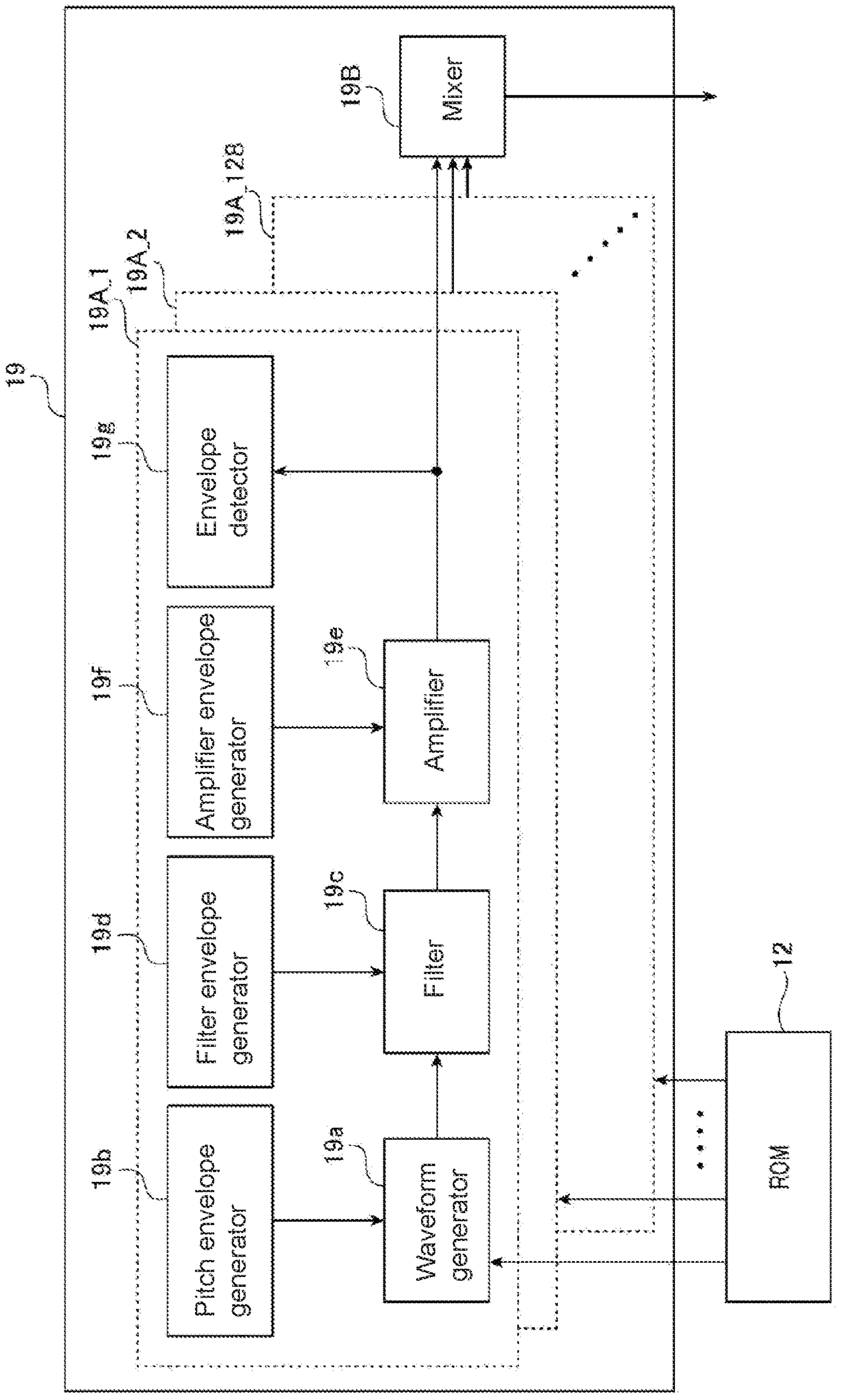
FIG. 2 is a block diagram showing a configuration of a sound source provided in the electronic musical instrument according to an embodiment of the present invention.

FIG. 2 is a block diagram showing a configuration of the sound source LSI 19. As shown in FIG. 2, the sound source LSI 19 includes 128 generator sections 19A_1 to 19A_128 and a mixer 19B. Generator sections 19A_1 to 19A_128 are provided corresponding to 128 simultaneous sound channels, respectively. The mixer 19B mixes the outputs of the generator sections 19A_1 to 19A_128 to generate a musical tone, and outputs the generated musical tone to the D/A converter 20. Each functional block of the sound source LSI 19 shown in FIG. 3 may be realized by software, or may be partially or wholly realized by hardware such as a dedicated logic circuit.

Each generator section 19A_1 to 19A_128 includes a waveform generator 19*a*, a pitch envelope generator 19*b*, a filter 19*c*, a filter envelope generator 19*d*, an amplifier 19*e*, an amplifier envelope generator 19*f*, and an envelope detector 19*g*.

The waveform generator 19*a* reads out the waveform data according to the instruction from the processor 10 from the ROM 12 at the pitch corresponding to the pitch envelope waveform output from the pitch envelope generator 19*b*.

The pitch envelope generator 19*b* applies temporal changes in the pitch when the waveform generator 19*a* reads out the waveform data from the ROM 12.

Figure 3A:
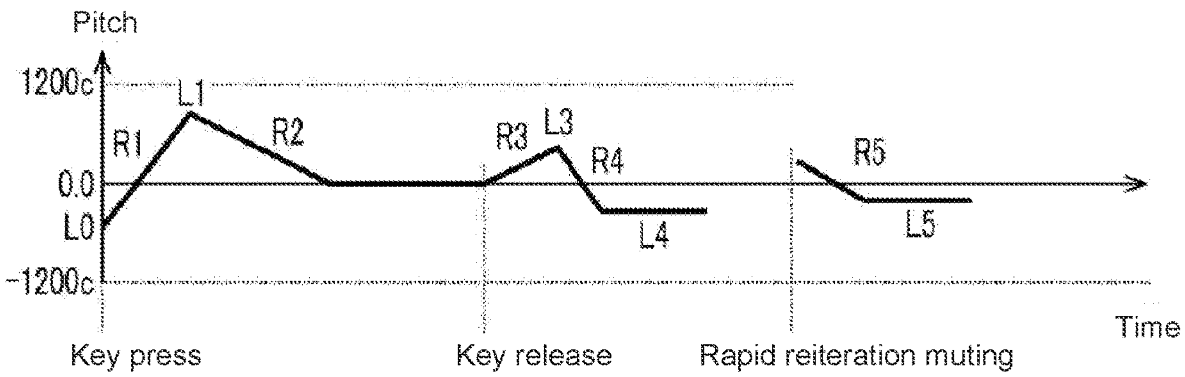
FIG. 3A is a diagram showing an example of a pitch envelope output from a pitch envelope generator provided in the sound source according to an embodiment of the present invention.

FIG. 3A shows an example of the pitch envelope output from the pitch envelope generator 19*b*. In FIG. 3A, the vertical axis indicates the pitch level and the horizontal axis indicates time. The variable range of pitch levels is −1200 cents to +1200 cents (−1 octave to +1 octave), and the level of this envelope is added to the played pitch.

The pitch envelope generator 19*b* outputs a pitch envelope according to the instruction by the processor 10 from among the three pitch envelopes respectively set for the key press event, the key release event, and the rapid reiteration event. The pitch envelope at the time of key pressing starts from level L0, reaches level L1 at speed R1, then descends at speed R2, and maintains a fixed level "0" which is a level when the key is continuously pressed. The pitch envelope at the time of key release reaches L3 at a speed R3 from the level at the time of key release, then descends at a speed R4, and finally maintains the level L4. The pitch envelope at the time of rapid reiteration muting stops the current note at the same time as the new note sound generation so that the pitch envelope goes to the level L5 at the speed R5.

The filter 19*c* changes the cutoff frequency according to the filter envelope output from the filter envelope generator 19*d*, and adjusts the frequency characteristics of the waveform data output from the waveform generator 19*a*.

The filter envelope generator 19*d* changes the cutoff frequency of the filter 19*c* over time.

Figure 3B:
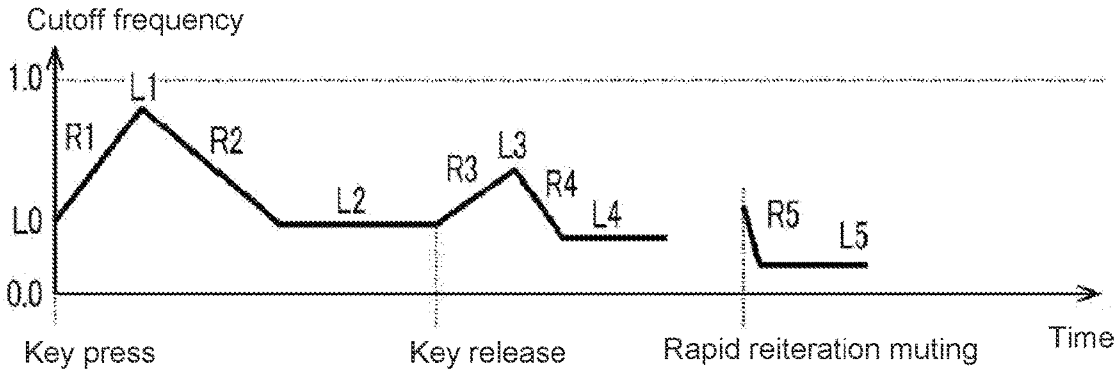
FIG. 3B is a diagram showing an example of a filter envelope output from a filter envelope generator provided in the sound source according to an embodiment of the present invention.

FIG. 3B shows an example of the filter envelope output from the filter envelope generator 19*d*. In FIG. 3B, the vertical axis indicates the level of the cutoff frequency of the filter 19*c*, and the horizontal axis indicates time. The variable range of the cutoff frequency level is from a minimum value of 0 to a maximum value of 1.0.

The filter envelope generator 19*d* outputs a filter envelope according to the instruction by the processor 10 from among the three filter envelopes respectively set for the key press event, the key release event, and the rapid reiteration event. The filter envelope at the time of key pressing starts from level L0, reaches level L1 at speed R1, and then descends at speed R2 to maintain level L2. The filter envelope at the time of key release reaches L3 at a speed R3 from the level L2 at the time of key release, then descends at a speed R4, and finally maintains the level L4. The filter envelope at the time of the rapid reiteration muting stops the current note at the same time as the new note sound generation so that the filter envelope goes to the level L5 at the speed R5.

The amplifier 19*e* adjusts the volume of the waveform data output from the filter 19*c* by changing the amplification factor according to the amplifier envelope output from the amplifier envelope generator 19*f*.

The amplifier envelope generator 19*f* changes the amplification factor of the amplifier 19*e* over time.

Figure 3C:
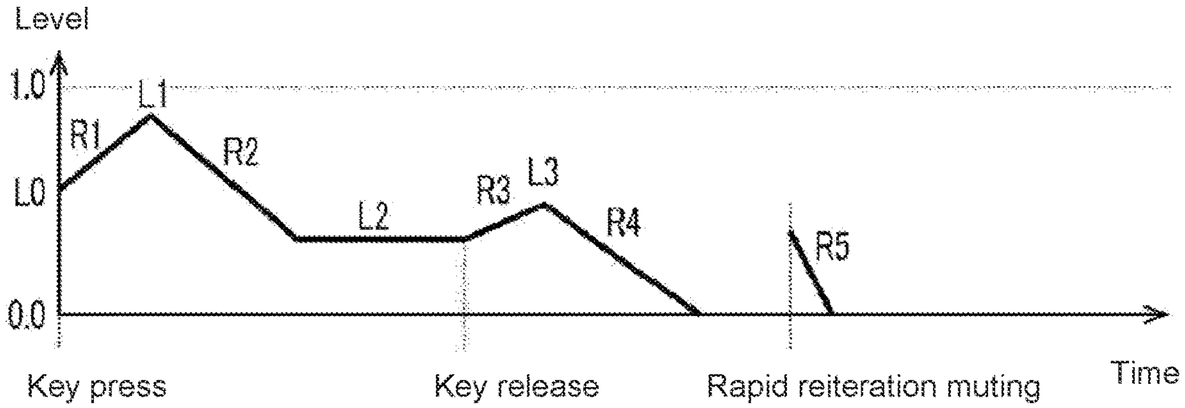
FIG. 3C is a diagram showing an example of an amplifier envelope output from an amplifier envelope generator provided in the sound source according to an embodiment of the present invention.

FIG. 3C shows an example of the amplifier envelope output from the amplifier envelope generator 19*f* In FIG. 3C, the vertical axis indicates the level of the amplification factor of the amplifier 19*e*, and the horizontal axis indicates time. The variable range of the amplification factor level is from a minimum value of 0 to a maximum value of 1.0.

The amplifier envelope generator 19*f* outputs an amplifier envelope according to an instruction from the processor 10 from among three amplifier envelopes respectively set for the key press event, the key release event, and the rapid reiteration event. The amplifier envelope at the time of key pressing starts from level L0, reaches level L1 at speed R1, and then descends at speed R2 to maintain level L2. The amplifier envelope at the time of key release reaches L3 at a speed R3 from the level L2 at the time of key release, then descends at a speed R4, and finally maintains a fixed level "0". The amplifier envelope at the time of the rapid reiteration muting stops the current note at the same time as the new note sound generation so that the envelope goes to the level "0" at the speed R5.

The envelope detector 19*g* detects the envelope of the waveform output from the amplifier 19*e*. For example, the envelope detector 19*g* detects the envelope (in other words, the amplitude value) of the waveform output from the amplifier 19*e* by converting the waveform output from the amplifier 19*e* into absolute values with a rectifying circuit, and by smoothing the absolute valued waveform with a low-pass filter.

Here, if the waveform level is normalized, the value of the amplifier envelope generator 19*f* may be applied as the envelope of the waveform output from the amplifier 19*e*. Even if the waveform level is not normalized, a virtual level envelope generator can be driven separately for each generator section, and the value obtained from the level envelope generator may be applied as the waveform envelope output from the amplifier 19*e*.

Figure 4:
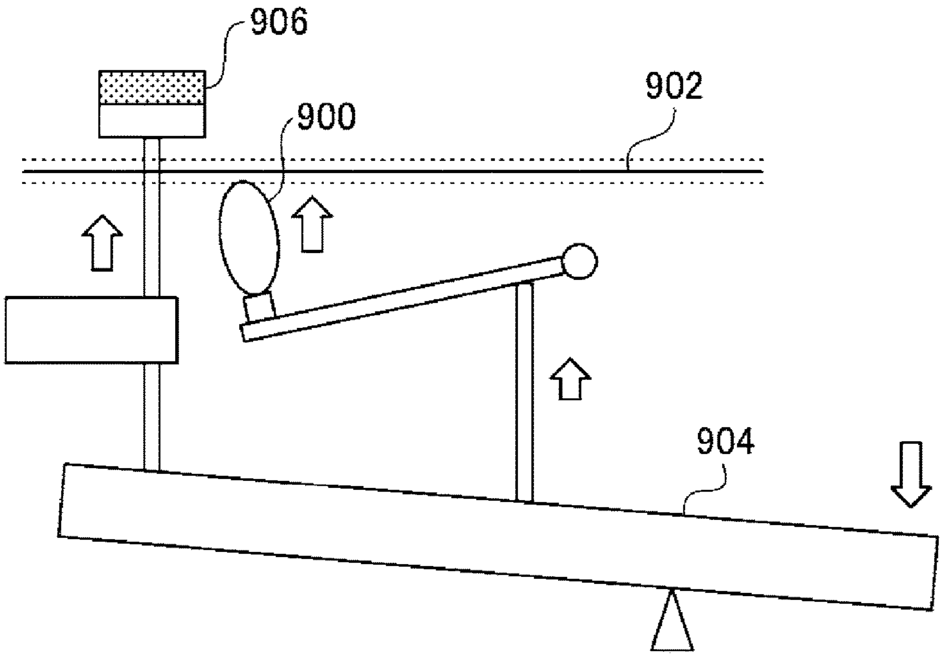
FIG. 4 is a schematic diagram of the action mechanism of an acoustic piano.
Figure 5:
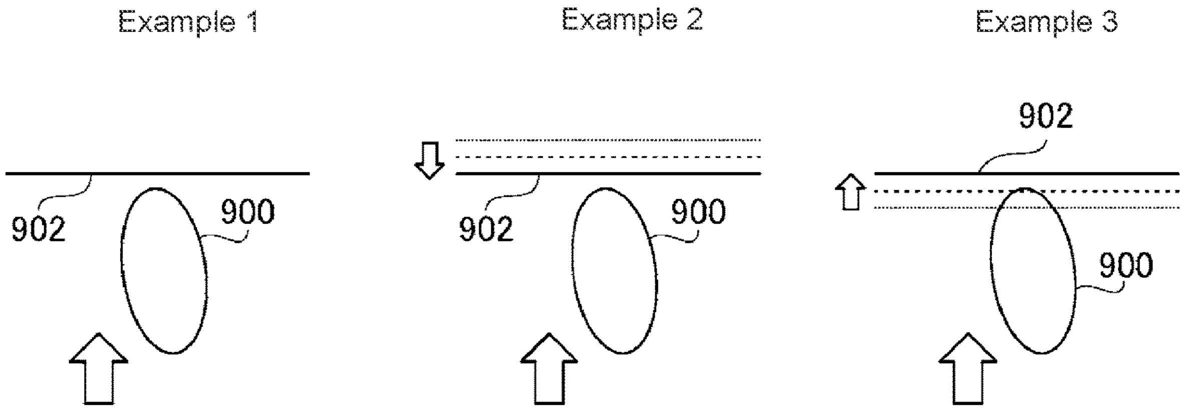
FIG. 5 is a schematic diagram showing the state of the action mechanism when the acoustic piano of FIG. 4 is pressed.

Here, in an acoustic piano, which is an example of an acoustic musical instrument, the characteristics of musical tones generated when an impact is applied to a vibrating body will be described. FIG. 4 is a schematic diagram of the action mechanism of an acoustic piano. FIG. 5 is a schematic view showing the states of the hammer 900 (impact body) and the string 902 (vibrating body) when the key is pressed. In these figures, a state in which the string 902 vibrates is schematically shown by showing a dotted line or a broken line on at least one of the upper and lower sides of the string 902.

As shown in FIG. 4, when the key 904 is hit, the damper 906 holding the string 902 rises and separates from the string 902. When the hammer 900 hits the string 902 with the damper 906 away from the string 902, the string 902 vibrates and a musical tone is generated.

When the user performs a rapid reiteration operation, the hammer 900 hits the vibrating string 902 that has been already vibrating. In this case, since the wave due to vibration moves on the string 902, the position (phase) of the wave at the time when the hammer 900 collides with the string 902 is basically different every time.

Further, as shown in Example 1 of FIG. 5, when the hammer 900 hits the string 902 while the string 902 is stationary, the string 902 is hit at the speed of the hammer 900. On the other hand, as shown in Example 2 of FIG. 5, when the vibrating string 902 collides with the hammer 900 while the string was moving downward (in the direction approaching the hammer 900), the relative speed between the hammer 900 and the string 902 is higher than in Example 1 (the state where the string 902 is stationary). Further, as shown in Example 3 of FIG. 5, when the vibrating string 902 collides with the hammer 900 while the string was moving upward (in the direction away from the hammer 900), the relative speed between the hammer 900 and the string 902 is smaller than Example 1.

These accidental elements (i.e., which phase of the wave on the string 902 the point of collision of the hammer 900 with respect to the string 902 is, what relative velocity these collide with each other, etc.) are related to the characteristics of the vibration amplitude and harmonic components of the string 902 of the string 902 after the key is pressed, and therefore, affects the timbre and volume, etc., of the resulting musical sounds. Accordingly, the pitch, timbre, and volume of the musical tone/sound during the rapid reiteration operation change unpredictably. Therefore, if the exact same pitch, tone, and volume are repeated during the rapid reiteration operation, an artificial or mechanical tone/sound is produced, and the musical tone during the rapid reiteration operation will be heard as an unnatural musical tone.

Therefore, in the present embodiment, a key pressing process described below is executed such that the musical sound generated during the rapid reiteration operation becomes closer to the natural musical tone.

In the key pressing process according to the present embodiment, the ratio of the current amplitude value (first amplitude value a) of the vibrating body that is vibrating to which an impact is to be applied in the rapid reiteration operation and the strength of the key pressing this time (second amplitude value b) is obtained. Based on this, the pitch, timbre, and volume of the musical tone (second musical tone) to be sound-produced this time are controlled. Generator sections 19A_1 to 19A_128 correspond to the vibrating body here. The amplitude value (first amplitude value a) of the vibrating body is detected by the envelope detector 19*g* in the generator section.

If the interval between repeated hits is short, there may be a situation where multiple generator sections generate the same key number in parallel, albeit momentarily. Generator sections that produce the same key numbered tones are treated as the same vibrating body. The sum of the values detected by the envelope detector 19*g* of all generator sections that generate the same key number musical tone is treated as the current amplitude value (first amplitude value a) of that key number.

The musical tone generated when a large impact is applied to a vibrating body that is vibrating small does not deviate much from the musical tone generated when an impact is applied while the vibrating body is stationary (referred to as "resting state musical tone" for convenience). On the other hand, the musical tone generated when a small impact is applied to a vibrating body that is vibrating greatly often has a large variation from the stationary musical tone. That is, the larger the ratio (a/b) of the current amplitude value (first amplitude value a) of the vibrating body to the strength of the latest key press (second amplitude value b), the greater the variations in the musical sound during the rapid reiteration operation tend to be. It should be noted that the "variation" here is a uncertainty generated due to the accidental elements exemplified above, and represents the degree of the changes in the musical tone generated when an impact is applied to the vibrating body that is vibrating relative to the stationary musical tone.

As an example, even when the hammer 900 comes into contact with the vibrating string 902, which is vibrating greatly, at a slow speed, the string 902 still violently collides with the hammer 900, so that the impact between them is large and the shape of the waves moving on the string 902 may change in a complicated manner. Therefore, the musical tone generated in that case tends to include complicated overtones that are not found in the stationary musical tone, or the volume tends to be loud. In the key pressing process described below, a musical tone is generated in consideration of these changes so that the musical tone during the rapid reiteration operation can be heard as a natural musical tone.

Figure 6:
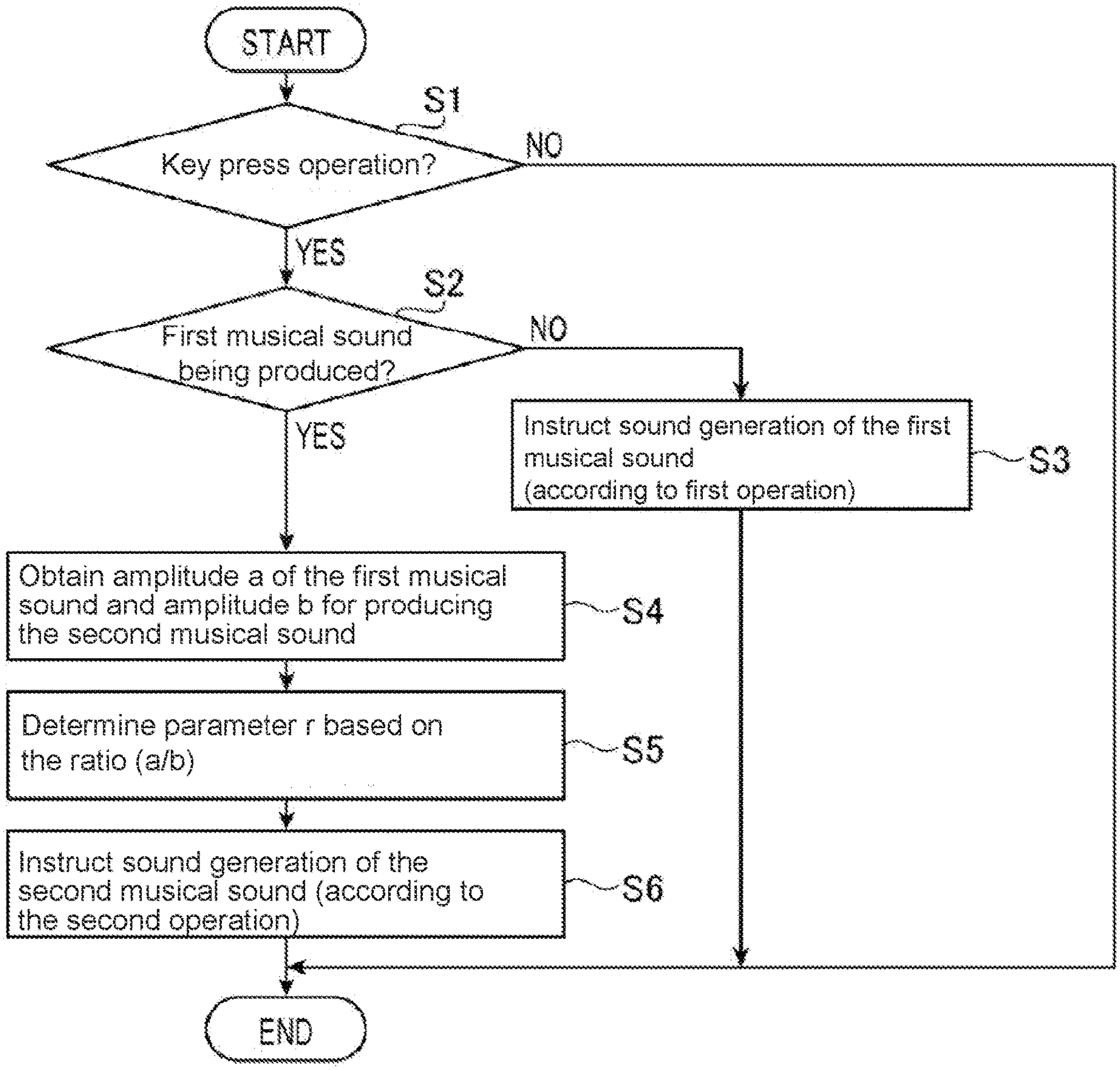
FIG. 6 is a flowchart of a key pressing process executed by a processor of an electronic musical instrument in one embodiment of the present invention.

FIG. 6 is a flowchart of the key pressing process executed by the processor 10 in cooperation with respective parts of the electronic musical instrument 1. As shown in FIG. 6, the processor 10 determines whether or not a key press operation has been detected (step S1). When the key press event information indicating the key number and velocity value of the key related to the key press operation is input from the key scanner 18 to the processor 10, the key press operation is detected (step S1: YES).

When the key press operation is detected (step S1: YES), the processor 10 determines whether or not a musical tone (that is, the first musical tone) corresponding to a key number that is the same as the key number acquired in step S1 has been produced (step S2). When the first musical tone has not been produced (step S2: NO), the processor 10 instructs the sound source LSI 19 to generate sound according to the key press event information acquired in step S1 (in other words, the sound generation of the first musical tone now occurs) (step S3). That is, in step S3, the processor 10 operates as a musical tone (sound) instruction part 101 that instructs the sound generation of the first musical tone in response to the first operation on the key (performance element). By this sound generation instruction, the reading of the waveform data is started in the corresponding generator section, and the output of the envelope is started from each envelope generator.

If the first musical tone (sound) has been produced (step S2: YES), the processor 10 acquires the first amplitude value a of the first musical tone (sound) (that is, the amplitude value of the first musical tone at the time of the second operation), and acquires the second amplitude value b for the second musical tone to be produced in response to the second operation, which is the detected key operation (step S4). That is, in step S4, the processor 10 operates as the amplitude value acquisition part 102 that acquires the first amplitude value a of the first musical tone and the second amplitude value b for the second musical tone to be produced, in response to the second operation (of the same key as the first key operation) that is performed during the sound generation of the first musical tone.

The processor 10 determines the parameter value r based on the ratio of the first amplitude value a and the second amplitude value b acquired in step S4 (step S5), and instructs the sound source LSI 19 to generate the sound of the second musical tone (in other words, sound generation according to the second operation) in accordance with the thus determined parameter value r (step S6). By this sound generation instruction, the reading of the waveform data is started in the generator section, and the output of the envelope is started from each envelope generator.

As will be described in detail later, the parameter value r is a parameter value for determining at least one of the pitch, timbre, and volume of the second musical tone. As described above, in step S5, the processor 10 operates as the parameter value determination part 103 that acquires the parameter value r for determining at least one of the pitch, timbre, and volume of the second musical tone based on the ratio of the first amplitude value a and the second amplitude value b. Further, in step S6, the processor 10 operates as the musical tone instruction part 101 that instructs the sound generation of the second musical tone according to the parameter value r acquired in step S5.

By producing the second musical tone according to the parameter value r, the tendency of the change of the second musical tone (that is, the tendency that the larger the ratio (a/b), the larger the change of the second musical tone) is reproduced more faithfully. It is therefore possible to bring the musical tone during the rapid reiteration operations closer to the characteristics of a natural musical tone such as an acoustic instrument.

As described above, when the first musical tone corresponding to the previous key press operation is being produced at the time of the second operation, the processes of steps S4 to S6 in FIG. 6 are executed. By executing the processes of steps S4 to S6, the characteristics of the musical sound during the rapid reiteration operation can be brought closer to the characteristics of the natural musical sound. The details of the processes of steps S4 to S6 will be described with reference to the flowchart of FIG. 7.

Figure 7:
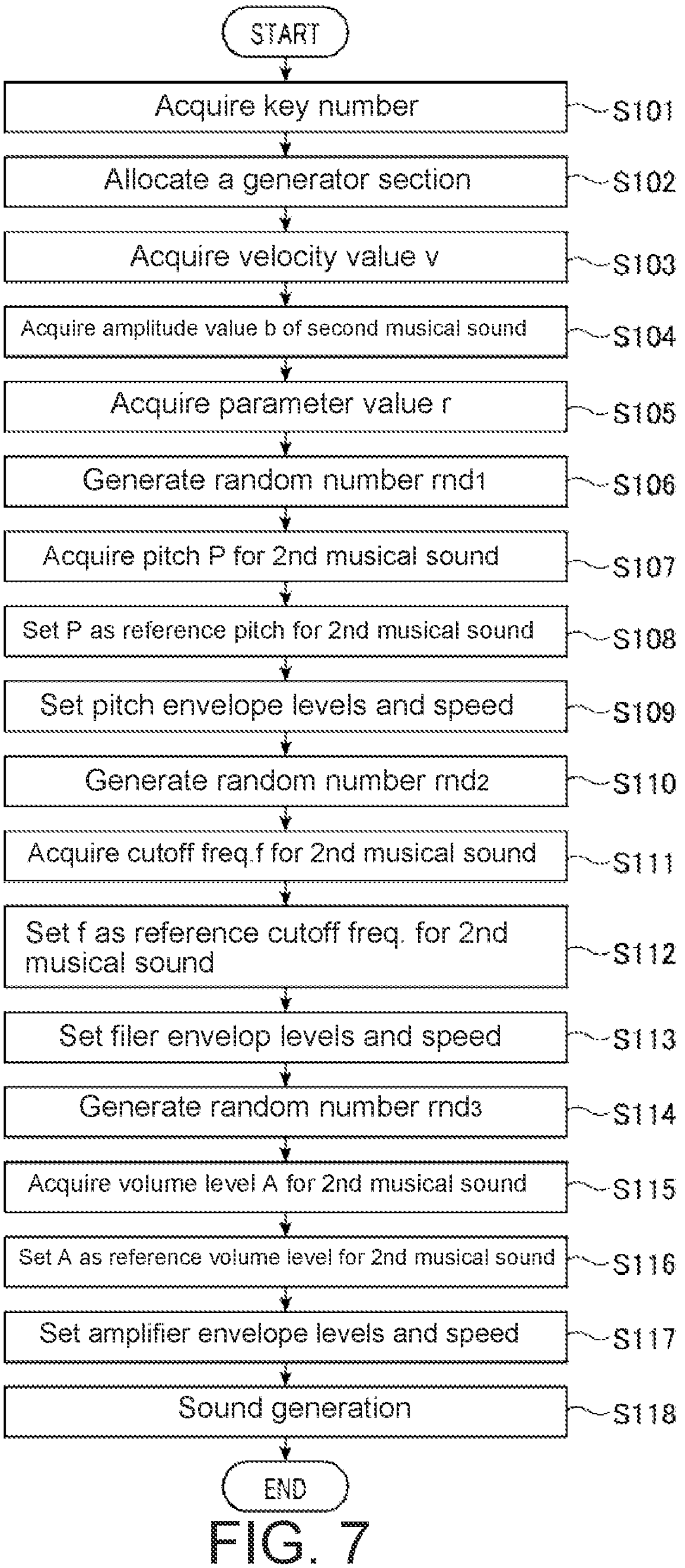
FIG. 7 is a flowchart of part of the key pressing process executed by the processor of the electronic musical instrument in one embodiment of the present invention.

As shown in FIG. 7, the processor 10 acquires the key number included in the key press event information input from the key scanner 18 (step S101).

The processor 10 executes a generator section allocation process for allocating a generator section used for sound generation processing based on the key number acquired in step S101 (step S102).

In the generator section allocation process, a generator section that is not currently used for generating a musical tone is detected from the generator sections 19A_1 to 19A_128, and the detected unused generator section is assigned as a generator section for producing a musical tone. If all of the generator sections 19A_1 to 19A_128 have been used to generate the musical tone, the generator section with the lowest level of waveform envelope is dumped and the dumped generator section is assigned as the one for producing a musical tone.

Figure 8:
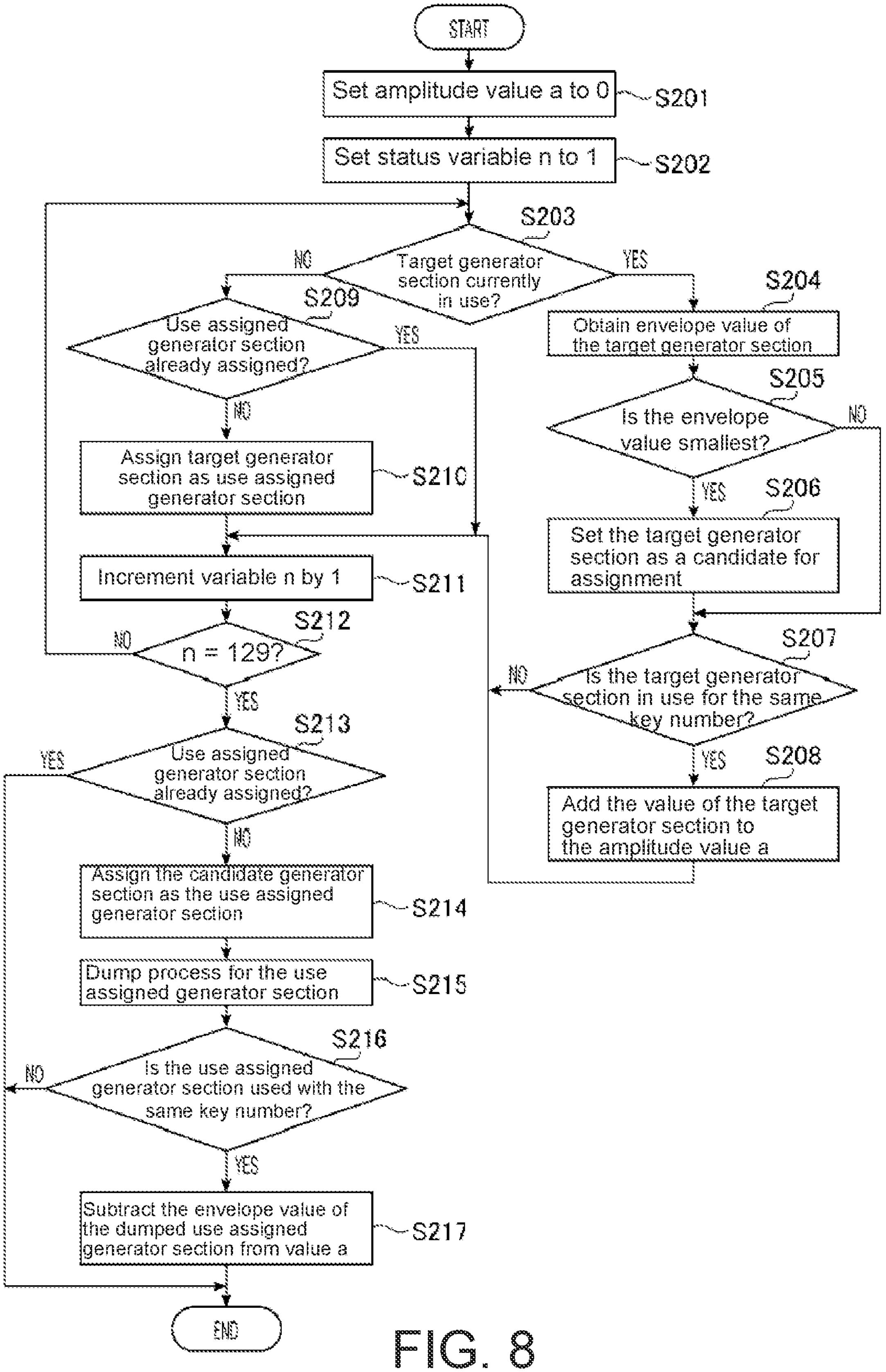
FIG. 8 is a flowchart of a generator section allocation process executed by a processor of an electronic musical instrument in one embodiment of the present invention.

FIG. 8 is a flowchart of the generator section allocation process.

As shown in FIG. 8, the processor 10 sets the first amplitude value a to zero (step S201). The first amplitude value a is the current amplitude value of the musical tone produced in response to the previous key pressing operation for the key of the key number pressed this time, and can be expressed as "the first amplitude value of the first musical sound corresponding to the first operation". Here, the total value of the respective envelopes detected by the respective envelope detectors 19$g$ is the first amplitude value a.

Numbers 1 to 128 are assigned to the generator sections 19A_1 to 19A_128, respectively. The processor 10 sets the variable n indicating the number of the generator section for which the status is to be confirmed to 1 (step S202). For convenience, the target generator section whose status is to be checked is referred to as "target generator section".

The processor 10 checks the status of the target generator section to which the same number as the variable n is assigned (step S203). Specifically, the processor 10 checks whether the target generator section is currently in use to generate a musical tone.

If the target generator section is currently used to generate a musical tone (step S203: YES), the processor 10 acquires the value of the envelope detected by the envelope detector 19*g* of the target generator section (step S204). The acquired envelope value ranges from a minimum value of 0 to a maximum value of 100.

The processor 10 compares the value of each envelope that has been acquired in step S204 up to now after the start of the allocation process of generator section with the value of the envelope acquired in step S204 at this time, and determines whether or not the value of the envelope acquired in step S204 is the smallest value (step S205).

When the value of the envelope acquired in step S204 this time is the smallest value (step S205: YES), the processor 10 sets the target generator section as a candidate to be used for generating a musical tone corresponding to the current key press operation (step S206). For convenience, the generator section set as such a candidate is referred to as "assignment candidate generator section". If the assignment candidate generator section is already set, the target generator section is overwritten as a new assignment candidate generator section. If the value of the envelope acquired in step S204 at this time is not the smallest value (step S205: NO), the processor 10 does not set the target generator section as the assignment candidate generator section.

The processor 10 determines whether or not the target generator section is in the process of generating a musical tone with the same key number as the key number acquired in step S101 (step S207). If a musical tone is being generated with the same key number (step S207: YES), the processor 10 adds the value of the envelope acquired in this step S204 to the first amplitude value a (step S208), and proceeds to step S211. When the musical tone is being generated with a different key number (step S207: NO), the processor 10 proceeds to step S211 without adding the value of the envelope to the first amplitude value a.

If the target generator section is not currently used to generate a musical tone (step S203: NO), the processor 10 determines whether or not a generator section for generating a musical tone corresponding to the current key press operation has already been assigned (step S209). For convenience, the one assigned as the generator section that generates the musical tone corresponding to the current key press operation is referred to as the "use assigned generator section".

If the use assigned generator section is not assigned (step S209: NO), the processor 10 assigns the target generator section as the use assigned generator section (step S210), and proceeds to step S211. If the use assigned generator section has already been allocated (step S209: YES), the processor 10 proceeds to step S211 without executing step S210.

The processor 10 increments the variable n by 1 (step S211). The processor 10 determines whether or not the variable n after the increment is 129 (step S212). If the variable n is not 129 (step S212: NO), the processor 10 returns to step S203 and executes the processes of step S203 and thereafter on the updated target generator section that is specified by the incremented variable n.

When the variable n is 129 (step S212: YES), processing such as status confirmation has been completed for all 128 generator sections 19A_1 to 19A_128. Therefore, the processor 10 determines whether or not the use assigned generator section has been already allocated (step S213). If the use assigned generator section has been assigned (step S213: YES), the processor 10 ends the generator section allocation process of FIG. 8.

If the use assigned generator section has not been assigned (step S213: NO), the processor 10 assigns the candidate generator section that has been finally set in step S206 as the use assigned generator section (step S214), and performs dump process on the use assigned generator section at the prescribed speed (for example, immediate dumping) (step S215).

The processor 10 determines whether or not the dumped use assigned generator section has generated the musical tone with the same key number as the key number acquired in step S101 (step S216). If the same key number is used to generate the musical tone (step S216: YES), the processor 10 subtracts the envelope value (that is, the amount muted by the dump processing) in the dumped use assigned generator section from the first amplitude value a (step S217), and ends the generator section allocation process of FIG. 8. If the musical tone has been generated with a different key number (step S216: NO), the processor 10 ends the generator section allocation process of FIG. 8 without executing step S217.

Returning to the explanation in FIG. 7, the processor 10 acquires the velocity value included in the key press event information input from the key scanner 18 (step S103). For convenience, this velocity value is assigned a reference numeral v. The velocity value v ranges from a minimum value of 1 to a maximum value of 127.

The processor 10 acquires the second amplitude value b of the musical tone corresponding to the latest key pressing operation by using the velocity value v indicating the speed of the current key pressing operation (from another viewpoint, the strength of the key pressing) (step S104). Here, as a specific example of acquiring the second amplitude value b, a method of calculating the second amplitude value b using the following equation (1) is shown.

The second amplitude value b may also be described as "a second amplitude value for the second musical tone (sound) corresponding to the current key pressing operation (second operation)". That is, in steps S102 to S104, the processor 10 operates as an amplitude value acquisition part 102 that acquires the first amplitude value a of the first musical tone that has been produced in response to the first operation on the performance element (a key of the keyboard 17 in this embodiment) and the second amplitude value b for the second musical tone to be produced according to the second operation on the same performance element (the same key number as the first operation) that is performed during the sound generation of the first musical tone.

$$b=(v/127)^2\times 100 \quad \text{[Equation (1)]}$$

Figure 9:
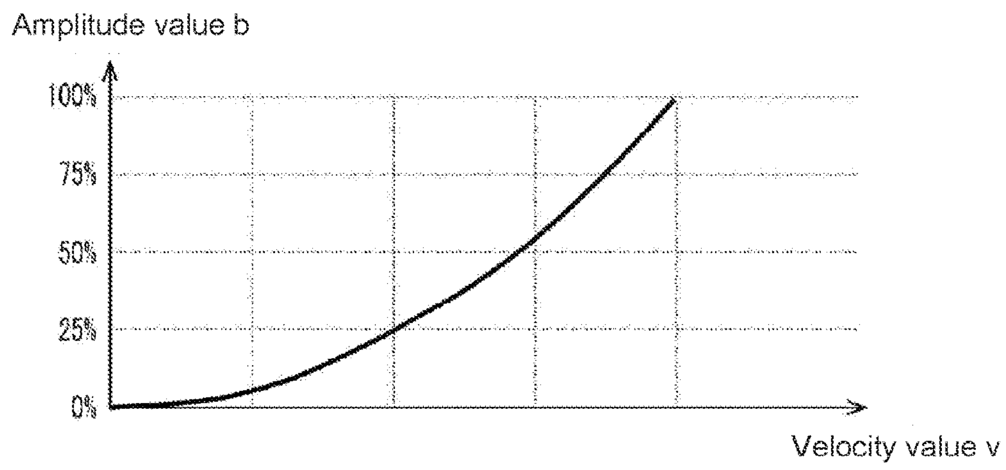
FIG. 9 is a graph showing the relationship between the amplitude value of the second musical tone corresponding to the second operation and the velocity value at the time of the second operation in one embodiment of the present invention.

FIG. 9 is a graph showing the relationship between the second amplitude value b and the velocity value v calculated by the equation (1). In FIG. 9, the vertical axis indicates the second amplitude value b, and the horizontal axis indicates the velocity value v. As shown in FIG. 9, the second amplitude value b increases quadratically with the velocity value v. The second amplitude value b ranges from a minimum value of 0 to a maximum value of 100.

As described above, the larger the ratio (a/b) of the amplitude value (first amplitude value a) of the vibrating body that is vibrating to the strength of the key press this time (second amplitude value b), the larger the variations in the musical sound during the rapid reiteration operations. Therefore, the processor 10 acquires the parameter value r that indicates the degree of the variations in the second musical tone (i.e., a value indicating the degree of the variations in pitch, timbre, and volume of the second musical during the rapid reiteration operation relative to the pitch, timbre, and volume of the stationary musical tone) (step S105). This way, in step S105, the processor 10 operates as the parameter value acquisition part 103 that acquires the parameter value r for determining the pitch, timbre, and volume of the second musical tone based on the ratio (a/b).

Here, as a specific example of acquiring the parameter value r, a method of calculating the parameter value r using the following equation (2) is shown.

$$r=\log_2(a/b)+N \qquad \text{[Equation (2)]}$$

Figure 10:
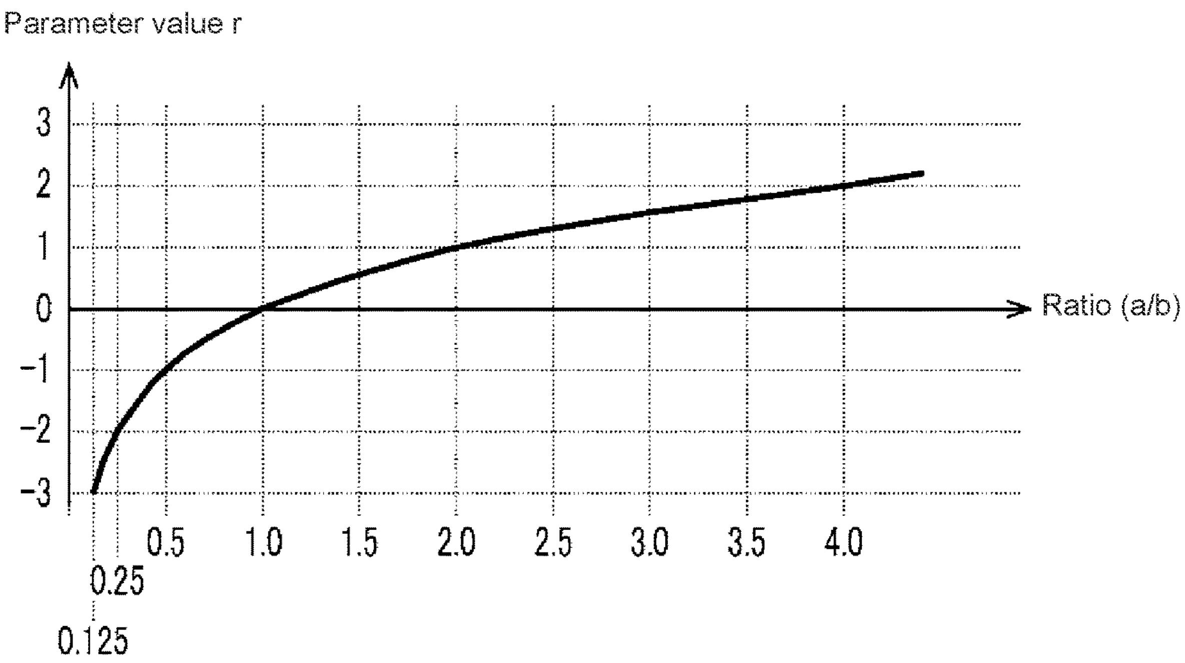
FIG. 10 is a graph showing the relationship between the parameter value for determining the second musical tone and the ratio of the first amplitude value and the second amplitude value in one embodiment of the present invention.

N: Adjustment parameter for setting the parameter value r to a value of zero or more FIG. 10 is a graph showing the relationship between the parameter value r calculated by the equation (2) and the ratio (a/b). In FIG. 10, the vertical axis indicates the parameter value r, and the horizontal axis indicates the ratio (a/b). As shown in FIG. 10, the parameter value r increases logarithmically according to the ratio (a/b). In other words, the parameter value r is a value that correlates with the ratio (a/b). Further, the larger the ratio (a/b), the larger the parameter value r.

If the ratio (a/b) is less than $\frac{1}{2}^N$, the parameter value r is clipped to zero.

If the ratio (a/b) becomes too large, the parameter value r also becomes too large, so there is a risk that the variation in the musical tone during the rapid reiteration operations will be calculated as an excessive value. Therefore, when the ratio (a/b) exceeds $2^N$, the parameter value r is clipped to a predetermined maximum value.

As an example, the adjustment parameter N is 5. In this case, the parameter value r is clipped to zero when the ratio (a/b) is less than 1/32. Further, when the ratio (a/b) exceeds 32, the parameter value r is clipped to 10 which is a predetermined maximum value. When the ratio (a/b) is 1/32 or more and 32 or less, the parameter value r takes a value of 0 to 10.

The processor 10 generates a random number mdi by a random function in order to give a natural change (for example, a change due to the above-mentioned accidental elements) to the pitch of the second musical tone produced by the latest key pressing operation (second operation) (step S106). The random number mdl is a value from −1 to +1.

The processor 10 acquires the pitch P of the second musical tone to which a natural change is to be given (step S107). Here, as a specific example of acquiring the pitch P, a method of calculating the pitch P using the following equation (3) is shown.

$$P=P_0+P_{DP}\cdot(r/10)\cdot(rnd_1+P_{OFF}/100) \qquad \text{[Equation (3)]}$$

$P_0$: Reference pitch
$P_{DP}$: Depth of pitch change
$P_{OFF}$: Offset value

The reference pitch $P_0$ is a pitch uniquely determined by the waveform data read from the ROM 12 (in other words, a pitch that is uniquely determined by the currently set tone color and the key press event information where a natural change is not given.). The reference pitch $P_0$ has a minimum value of 0 and a maximum value of 100.

Depth $P_{DP}$ is the depth (degree) of the pitch change, and has a minimum value of 0 to a maximum value of 100.

The offset value $P_{OFF}$ adjusts the increase/decrease balance of the change in pitch by being added to the random number $rnd_1$, and takes a value of −100 to +100.

The depth $P_{DP}$ and the offset value $P_{OFF}$ are preset to appropriate values for each musical tone (guitar, piano, etc.) and key number, for example. Further, the depth $P_{DP}$ and the offset value $P_{OFF}$ may be changed by the user operation on the switch panel 13.

In the present embodiment, the range of the pitch P is a minimum value of 0 to a maximum value of 100. Therefore, when the pitch P becomes less than zero according to the equation (3), the pitch P is clipped to zero. When the pitch P exceeds 100 according to the equation (3), the pitch P is clipped to 100.

The processor 10 sets the pitch P acquired in step S107 as the reference pitch of the second musical tone in the waveform generator 19*a* (step S108). As a result, when the second musical tone becomes a musical tone generated during the rapid reiteration operation, the musical tone is produced at a pitch with a natural change.

In order to change the reference pitch set in step S108 over time, the processor 10 sets the pitch envelope levels L0, L1 and speed R1 from the information acquired from the currently set tone color and key press event information (step S109).

The processor 10 generates a random number $rnd_2$ by a random function in order to give a natural change (for example, a change due to the above-mentioned accidental elements) to the timbre of the second musical tone produced by the latest key pressing operation (second operation) (step S110). The random number $rnd_2$ is a value from −1 to +1.

The processor 10 acquires the cutoff frequency f for the second musical tone to which a natural change is to be given (step S111). Here, as a specific example of acquiring the cutoff frequency f, a method of calculating the cutoff frequency f using the following equation (4) is shown.

$$f=f_0+f_{DP}\cdot(r/10)\cdot(rnd_2+f_{OFF}/100) \qquad \text{[Equation (4)]}$$

$f_0$: Reference cutoff frequency
$f_{DP}$: Depth of change in cutoff frequency
$f_{OFF}$: Offset value The reference cutoff frequency $f_0$ is a cutoff frequency uniquely determined by the waveform data read from the ROM 12 (in other words, a cutoff frequency when no natural change is given, and which is uniquely determined by the currently set tone color and key press event). The reference cutoff frequency $f_0$ ranges has a minimum value of 0 and a maximum value of 100.

The depth $f_{DP}$ is the depth (degree) of change in the cutoff frequency, and has a minimum value of 0 and a maximum value of 100.

The offset value $f_{OFF}$ adjusts the increase/decrease balance of the change in the cutoff frequency by being added to the random number $rnd_2$, and takes a value of −100 to +100. It should be noted that the musical sound during the rapid reiteration operation tends to have a higher volume and overtone components than the single striking sound (that is, the stationary musical tone). Therefore, by setting the offset value $f_{OFF}$ to a positive value, it is possible to adjust the cutoff frequency f so that it is likely to change to a value higher than the original reference cutoff frequency $f_0$. In addition, by setting the offset value $f_{OFF}$ to +100, the cutoff frequency f can be adjusted so as to always change to a value equal to or higher than the original reference cutoff frequency $f_0$.

The depth $f_{DP}$ and the offset value $f_{OFF}$ may also be preset to appropriate values for each tone color and key number, or may be changeable by user operation.

In the present embodiment, the range of the cutoff frequency f is a minimum value of 0 to a maximum value of 100. Therefore, when the cutoff frequency f becomes less than zero according to the equation (4), the cutoff frequency f is clipped to zero. When the cutoff frequency f exceeds 100 according to the equation (4), the cutoff frequency f is clipped to 100.

The processor 10 sets the cutoff frequency f acquired in step S111 as the reference cutoff frequency for the second musical tone in the filter 19*c* (step S112). As a result, when the second musical tone becomes a musical tone generated during the rapid reiteration operation, the musical tone is generated at a cutoff frequency with a natural change.

In order to change the reference cutoff frequency set in step S112 over time, the processor 10 sets the levels L0, L1 and the speed R1 of the filter envelope from the information acquired from the currently set tone color and key press event information (step S113).

The processor 10 generates a random number $rnd_3$ by a random function in order to give a natural change (for example, a change due to the above-mentioned accidental elements) to the volume of the second musical tone produced by the latest key pressing operation (second operation) (step S114). The random number $rnd_3$ is a value from −1 to +1.

The processor 10 acquires the volume level A of the second musical tone to which a natural change is to be given (step S115). Here, as a specific example of acquiring the volume level A, a method of calculating the volume level A using the following equation (5) is shown.

$$A=A_0\cdot(A_{DP}/100)\cdot 2\hat{}[(r/10)\cdot\{rnd_3+(AOFF/100)\}] \qquad \text{[Equation (5)]}$$

$A_0$: Reference volume level $A_{DP}$: Depth of change in volume level $A_{OFF}$: Offset value The reference volume level $A_0$ is a volume level uniquely determined by the waveform data read from the ROM 12 (in other words, a volume level when no natural change is given, which is uniquely determined based on the currently set tone color and key press event information). The reference volume level $A_0$ has a minimum value of 0 and a maximum value of 100.

Depth $A_{DP}$ is the depth (degree) of change in volume level, and has a minimum value of 0 and a maximum value of 100.

The offset value $A_{OFF}$ adjusts the increase/decrease balance of the change in volume level by being added to the random number $rnd_3$, and takes a value of −100 to +100. As described above, the musical sound during the rapid reiteration operation tends to have a higher volume and overtone components than the single striking sound. Therefore, by setting the offset value $A_{OFF}$ to a positive value, it is possible to adjust the volume level A so that it is likely to change to a value higher than the original reference volume level $A_0$.

The depth $A_{DP}$ and the offset value $A_{OFF}$ may also be preset to appropriate values for each tone and key number, or may be changeable by user operation.

In the present embodiment, the range of the volume level A is a minimum value of 0 to a maximum value of 100. Therefore, when the volume level A exceeds 100 according to the equation (5), the volume level A is clipped to 100.

The processor 10 sets the volume level A acquired in step S115 as the reference volume level of the second musical tone in the amplifier 19*e* (step S116). As a result, when the second musical tone becomes a musical tone during the rapid reiteration operation, the musical tone is generated at a volume level (in other words, an amplification factor) with a natural change.

In order to change the reference volume level set in step S116 over time, the processor 10 sets the amplifier envelope levels L0, L1 and the speed R1 from the information acquired from the currently set tone color and key press event information (step S117).

The processor 10 issues a sound generation instruction for the use assigned generator section set in the generator section allocation process of FIG. 8 to the sound source LSI 19 (step S118). That is, in step S118, the processor 10 operates as the musical tone instruction part 101 that instructs the sound production of the second musical tone according to the parameter value r acquired in step S105. As described above, in this embodiment, the processor 10 operating as the musical tone instruction part 101 multiplies the parameter value r by the random numbers generated based on the random function (see steps S107, S111 and S115), and instructs the sound generation of the second musical sound in accordance with the value obtained by the multiplication. By this sound generation instruction, the reading of the waveform data is started in the use assigned generator section, and the output of the envelope is started from each envelope generator, thereby completing the key pressing process of FIG. 7.

Therefore, the second musical tone generated in the use assigned generator section by executing the key pressing process in FIG. 7 is given an unpredictable change that occurs when an impact is applied again to the vibrating body that is vibrating during the rapid reiteration operation. Therefore, in the present embodiment, the artificial or mechanical unnaturalness of the musical sound during the rapid reiteration operation can be avoided. More specifically, the parameter value is based on the ratio (a/b) of the current first amplitude value a of the vibrating body to the second amplitude value b for the second musical tone to be produced in response to the latest key press operation. Since r is calculated each time and a natural change is given to the second musical tone each time using the calculated parameter value r, the tendency of the change of the second musical tone (that is, the larger the ratio (a/b) is, the more the second musical tone changes) can be reproduced more faithfully, and it becomes possible to approach the characteristics of natural musical tones such as acoustic musical instruments.

The effect of giving the natural change to the second musical tone by executing the key pressing process of FIG. 7 will be described with reference to FIGS. 11 to 16.

Figure 11:
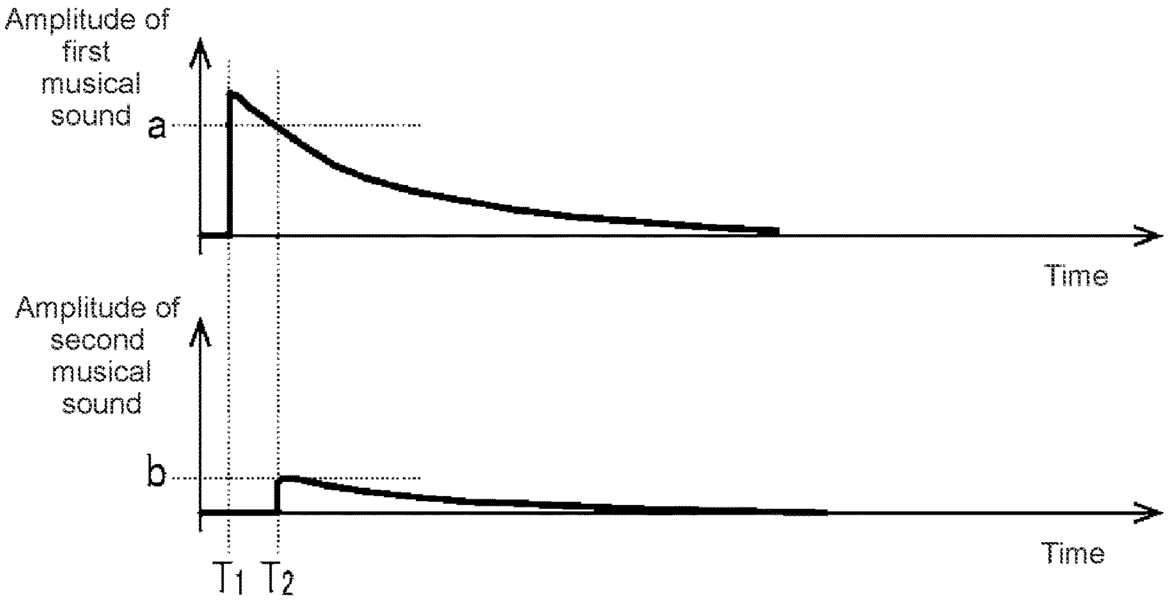
FIG. 11 is a diagram showing the amplitude values of the first musical tone and the second musical tone of Comparative Example 1.
Figure 12:
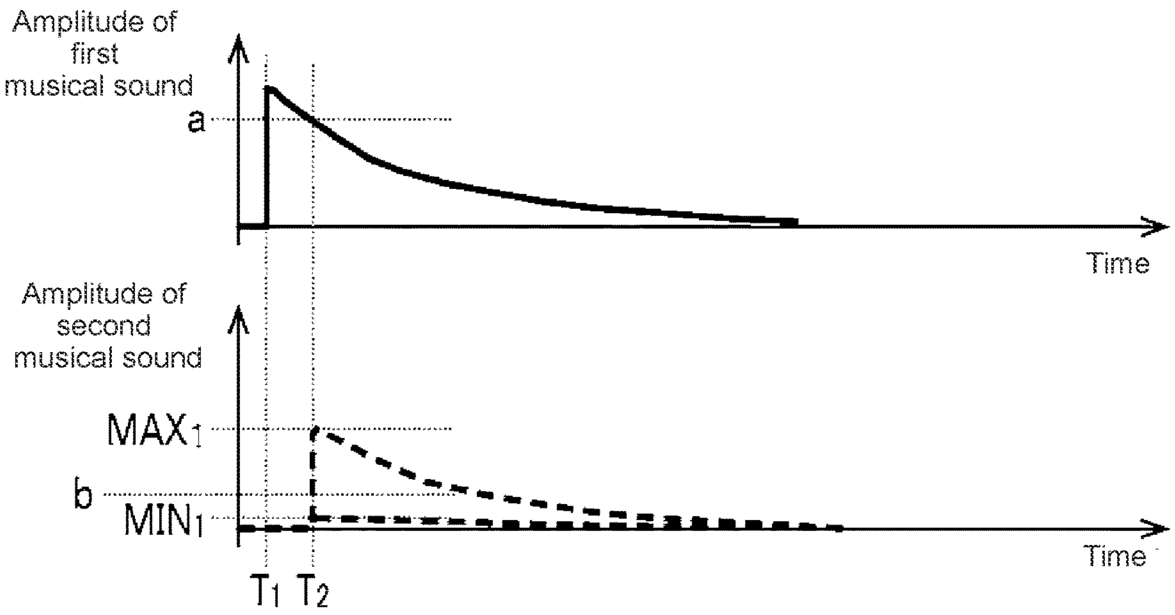
FIG. 12 is a diagram showing the amplitude values of the first musical tone and the second musical tone of Embodiment 1.

FIGS. 11-12 are diagrams illustrating Case 1. Case 1 is a case where the key of the same key number as the first operation is weakly pressed when the first amplitude value a is large (in other words, the first amplitude value a is large and the second amplitude value b is small).

Figure 13:
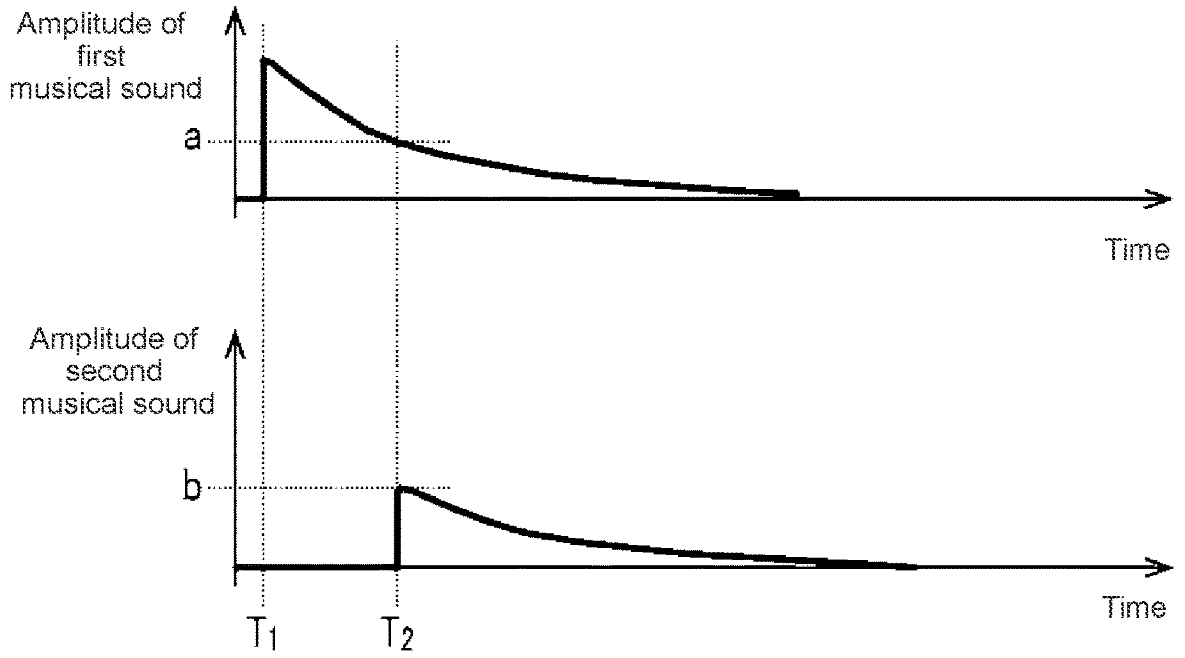
FIG. 13 is a diagram showing the amplitude values of the first musical tone and the second musical tone of Comparative Example 2.
Figure 14:
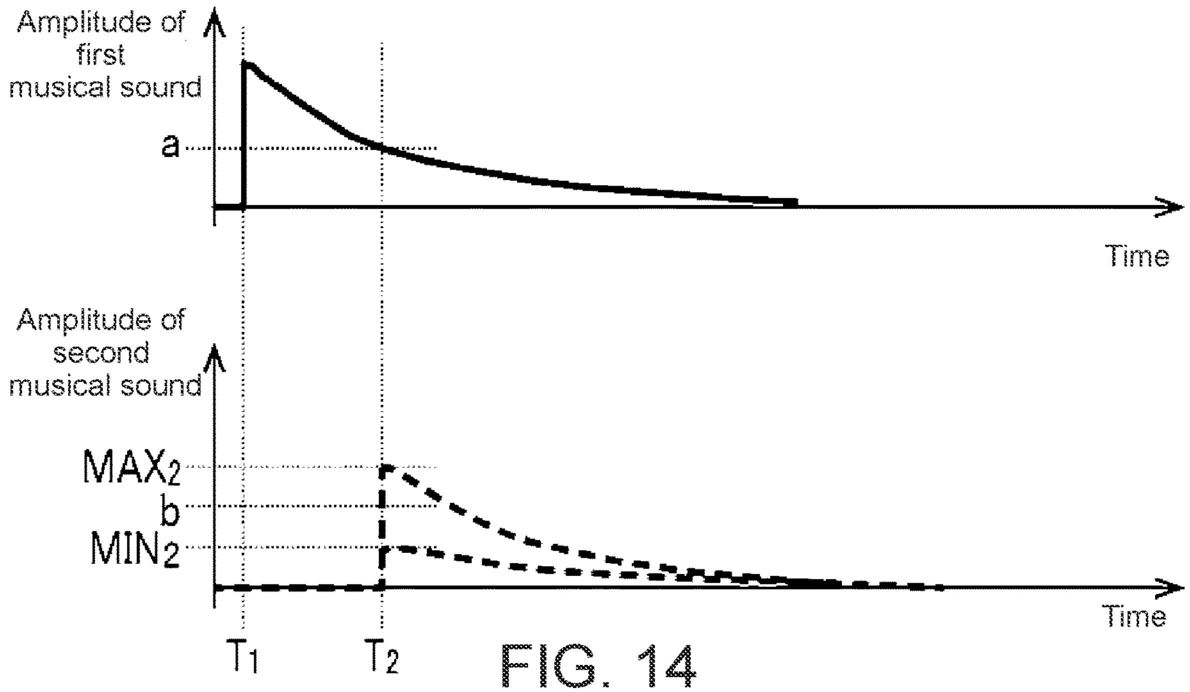
FIG. 14 is a diagram showing the amplitude values of the first musical tone and the second musical tone of Embodiment 2.

FIGS. 13-14 are diagrams illustrating Case 2. In Case 2, the key of the same key number as the first operation is pressed at a medium strength when the first amplitude value a is medium (in other words, the first amplitude value a is medium and the second amplitude value b is also medium).

Figure 15:
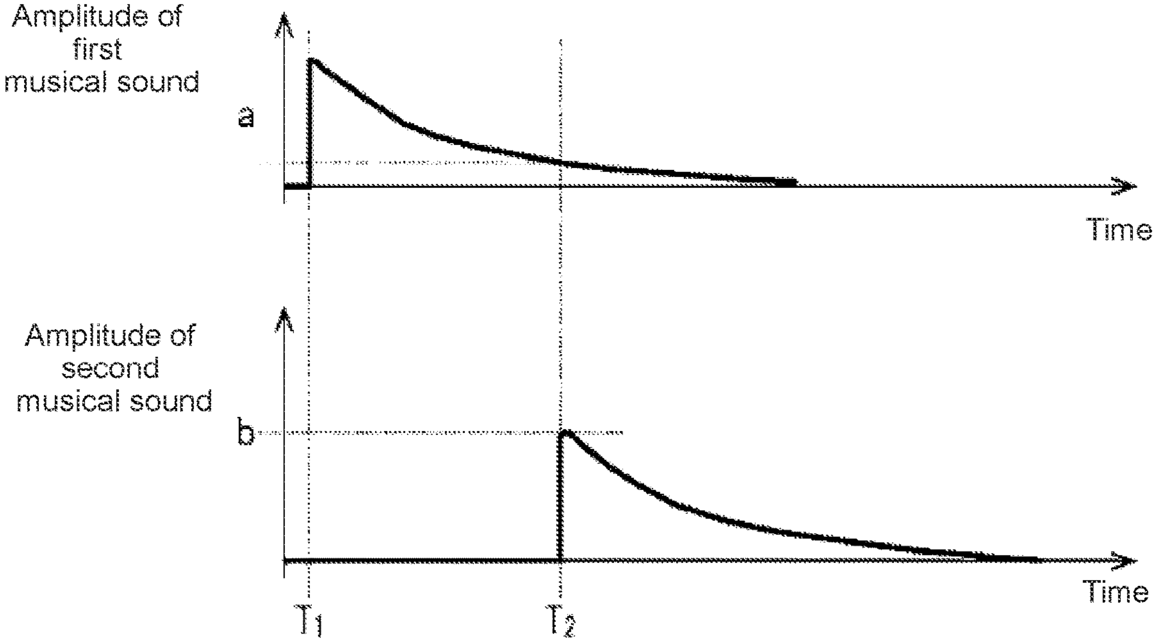
FIG. 15 is a diagram showing the amplitude values of the first musical tone and the second musical tone of Comparative Example 3.
Figure 16:
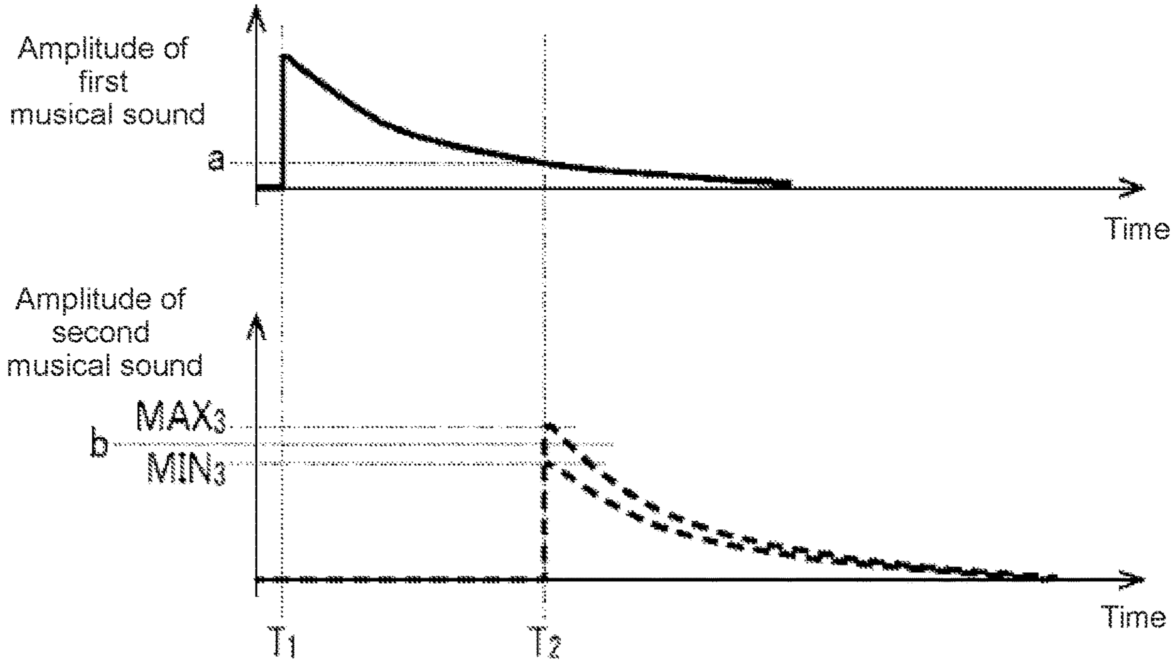
FIG. 16 is a diagram showing the amplitude values of the first musical tone and the second musical tone of Embodiment 3.

FIGS. 15-16 are diagrams illustrating Case 3. Case 3 is a case where the key of the same key number as the first operation is strongly pressed when the first amplitude value a is small (in other words, the first amplitude value a is small and the second amplitude value b is large).

In each of FIGS. 11 to 16, the upper figure shows the amplitude value of the first musical tone, and the lower figure shows the amplitude value of the second musical tone. In each of FIGS. 11 to 16, the vertical axis represents the amplitude value and the horizontal axis represents time. Reference numeral T1 indicates a time point when the first operation is performed, and reference numeral T2 indicates a time point when the second operation is performed. Each of FIGS. 11 to 16 is a schematic diagram showing that the amplitude instantly increases to the maximum value at the time of each operation and then gradually attenuates.

FIG. 11 shows Comparative Example 1 (Comparative Example of Case 1), and FIG. 12 shows Embodiment 1 (Embodiment of Case 1). FIG. 13 shows Comparative Example 2 (Comparative Example of Case 2), and FIG. 14 shows Embodiment 2 (Embodiment of Case 2). FIG. 15 shows Comparative Example 3 (Comparative Example of Case 3), and FIG. 16 shows Embodiment 3 (Embodiment of Case 3).

In each case, in order to compare the second musical tones of the comparative example and the embodiment, the first musical tone is the same in the comparative example and the embodiment. For the second musical tone, the conditions of the second operation (timbre, key number, velocity value) are the same in the comparative example and the embodiment. The second musical tone of each comparative example is the second musical tone with no natural change being given, and is uniquely determined by the currently set timbre and the key press event information. The second musical tone of each embodiment is the second musical tone with a natural change being given by executing the key pressing process of FIG. 7.

In the lower figures of FIGS. 12, 14 and 16, the amplitude value of the second musical tone produced in the embodiment fluctuates within the range sandwiched by the two broken lines as a result of a natural change being given. The upper dashed line shows the case where the amplitude value of the second musical tone changes to the largest value as a result of a natural change being given, and the lower dashed line shows the case where the amplitude value of the second musical tone changes to the smallest value as a result of a natural change being given.

For convenience, in Case 1, the symbol $MAX_1$ is attached to the amplitude value of the second musical tone at the time of $T_2$ when it changes to the largest value, and the symbol $MIN_1$ is attached to the amplitude value of the second musical tone at the time of $T_2$ when it changes to the smallest value. Further, in Case 2, the symbol $MAX_2$ is attached to the amplitude value of the second musical tone at the time of $T_2$ when the value changes to the largest value, and the symbol $MIN_2$ is attached to the amplitude value of the second musical tone at the time of $T_2$ when the value changes to the smallest value. Further, in Case 3, the symbol $MAX_3$ is attached to the amplitude value of the second musical tone at the time of $T_2$ when the value changes to the largest value, and the symbol $MIN_3$ is attached to the amplitude value of the second musical tone at the time of $T_2$ when the value changes to the smallest value.

In the comparative examples, as shown in the lower figures of FIGS. 11, 13, and 15, regardless of the magnitude of the first amplitude value a, the second musical tone always takes the prescribed amplitude profile determined according to the velocity at the time of the second operation. Therefore, in any of the comparative examples of Cases 1 to 3, the artificial or mechanical unnaturalness of the musical sound during the rapid reiteration operation is unavoidable.

On the other hand, in the Embodiments, as shown in the lower figures of FIGS. 12, 14 and 16, the amplitude value of the second musical tone fluctuates randomly within the range sandwiched by the two broken lines. Therefore, in any of the first to third Embodiments, an artificial or mechanical unnaturalness of the musical tones during the rapid reiteration operation can be avoided.

Case 1 has the largest ratio (a/b) among Cases 1 to 3. Case 3 has the smallest ratio (a/b) among Cases 1 to 3. The ratio of Case 2 (a/b) is an intermediate value between the ratio of Case 1 (a/b) and the ratio of Case 3 (a/b). Comparing the lower figures of FIGS. 12, 14 and 16, the difference between $MAX_1$ and $MIN_1$ is the largest, the difference between $MAX_2$ and $MIN_2$ is the next largest, and the difference between $MAX_3$ and $MIN_3$ is the smallest. That is, the magnitude of the fluctuation of the second musical tone is the largest in the Case 1 and the smallest in the Case 3. As described above, in these Embodiments, it can be seen that the tendency that the change in the second musical tone becomes larger as the ratio (a/b) becomes larger is faithfully reproduced. Therefore, it can be seen that the electronic musical instrument 1 has been improved; it makes the musical sound during the rapid reiteration operation closer to the natural musical sound.

The present invention is not limited to the above-described embodiments, and can be modified at the implementation stage without departing from the gist thereof. The functions executed in the above-described embodiment may be combined as appropriate as possible. The embodiments described above include various stages, and various inventions can be extracted by an appropriate combination according to a plurality of disclosed constituent requirements. For example, even if some constituent elements are deleted from the constituent elements shown in the embodiment, if the same or similar effect can be obtained, the configuration in which the constituent elements are deleted can be regarded as an invention.

For example, in the above embodiments, the pitch, timbre, and volume of the second musical tone are all changed based on the parameter value r, but the configuration of the present invention is not limited to this. Even when one or two of the pitch, timbre, and volume of the second musical tone are changed based on the parameter values, the artificial or mechanical unnaturalness of the musical tone during repeated striking operations is avoided and the characteristics of the natural musical tone are approached to adequate degree for some applications.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic musical instrument, comprising:

a performance controller; and at least one processor, configured to perform the following:

instructing sound generation of a first musical tone in response to a first operation on the performance controller;

in response to a second operation on the performance controller during the sound generation of the first musical tone, obtaining a first amplitude value of the first musical tone at a time of the second operation, and obtaining a second amplitude value at which a second musical tone is to be sound-produced in response to the second operation on the performance controller;

acquiring a parameter value for determining at least one of pitch, timbre, and volume of the second musical tone based on a ratio of the first amplitude value to the second amplitude value; and instructing sound generation of the second musical tone in accordance with the acquired parameter value, wherein the parameter value is acquired by the following equation:

$$\text{parameter value}=\log_2(a/b)+N,$$

where a is the first amplitude value, b is the second amplitude value, and N is an adjustment parameter for setting the parameter value to a value of zero or greater.

2. The electronic musical instrument according to claim 1, wherein the parameter value correlates with the ratio of the first amplitude value to the second amplitude value.

3. The electronic musical instrument according to claim 1, wherein the larger the ratio of the first amplitude value to the second amplitude value, the larger the parameter value.

4. The electronic musical instrument according to claim 1, wherein the at least one processor multiplies the parameter value by a random number generated by a random function, and instructs the sound generation of the second musical tone according to a value obtained by the multiplication.

5. The electronic musical instrument according to claim 3, wherein the at least one processor multiplies the parameter value by a random number generated by a random function, and instructs the sound generation of the second musical tone according to a value obtained by the multiplication so that the greater the ratio of the first amplitude value to the second amplitude value, the more the sound generation of the second musical tone fluctuates in at least one of the pitch, timbre, and volume.

6. The electronic musical instrument according to claim 1, further comprising a keyboard that includes the performance controller, wherein the first operation and the second operation are key pressing operations on the keyboard.

7. A method executed by at least one processor in an electronic musical instrument that includes, in addition to the at least one processor, a performance controller, the method comprising, via the at least one processor:

instructing sound generation of a first musical tone in response to a first operation on the performance controller;

in response to a second operation on the performance controller during the sound generation of the first musical tone, obtaining a first amplitude value of the first musical tone at a time of the second operation, and obtaining a second amplitude value at which a second musical tone is to be sound-produced in response to the second operation on the performance controller;

acquiring a parameter value for determining at least one of pitch, timbre, and volume of the second musical tone based on a ratio of the first amplitude value to the second amplitude value; and instructing sound generation of the second musical tone in accordance with the acquired parameter value, wherein the parameter value is acquired by the following equation:

$$\text{parameter value}=\log_2(a/b)+N,$$

where a is the first amplitude value, b is the second amplitude value, and N is an adjustment parameter for setting the parameter value to a value of zero or more.

8. The method according to claim 7, wherein the parameter value correlates with the ratio of the first amplitude value to the second amplitude value.

9. The method according to claim 7, wherein the larger the ratio of the first amplitude value to the second amplitude value, the larger the parameter value.

10. The method according to claim 7, wherein the parameter value is multiplied by a random number generated by a random function, and the sound generation of the second musical tone is instructed according to a value obtained by the multiplication.

11. The method according to claim 9, wherein the parameter value is multiplied by a random number generated by a random function, and the sound generation of the second musical tone is instructed according to a value obtained by the multiplication so that the greater the ratio of the first amplitude value to the second amplitude value, the more the sound generation of the second musical tone fluctuates in at least one of the pitch, timbre, and volume.

12. The method according to claim 7, wherein the first operation and the second operation are key-pressing operations on a keyboard including the performance operator.

13. A computer readable non-transitory storage medium storing therein instructions, the instructions causing at least one processor in an electronic musical instrument that includes, in addition to the at least one processor, a performance controller to perform the following:

instructing sound generation of a first musical tone in response to a first operation on the performance controller;

in response to a second operation on the performance controller during the sound generation of the first musical tone, obtaining a first amplitude value of the first musical tone at a time of the second operation, and obtaining a second amplitude value at which a second musical tone is to be sound-produced in response to the second operation on the performance controller;

acquiring a parameter value for determining at least one of pitch, timbre, and volume of the second musical tone based on a ratio of the first amplitude value to the second amplitude value; and instructing sound generation of the second musical tone in accordance with the acquired parameter value, wherein the parameter value is acquired by the following equation:

$$\text{parameter value}=\log_2(a/b)+N,$$

where a is the first amplitude value, b is the second amplitude value, and N is an adjustment parameter for setting the parameter value to a value of zero or more.

* * * * *